US006202163B1

United States Patent
Gabzdyl et al.

(10) Patent No.: US 6,202,163 B1
(45) Date of Patent: *Mar. 13, 2001

(54) DATA PROCESSING CIRCUIT WITH GATING OF CLOCKING SIGNALS TO VARIOUS ELEMENTS OF THE CIRCUIT

(75) Inventors: Rebecca Gabzdyl, Frimley; Richard Lansdowne, Chandlers Ford; Brian Patrick McGovern, Camberley, all of (GB)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,829

(22) Filed: Mar. 10, 1998

(30) Foreign Application Priority Data

Mar. 14, 1997 (GB) .................................................. 9705314

(51) Int. Cl.[7] ....................................................... G06F 1/32
(52) U.S. Cl. ............................................................. 713/324
(58) Field of Search ................................... 713/300, 320, 713/322, 323, 324

(56) References Cited

U.S. PATENT DOCUMENTS

| 5,276,889 | 1/1994 | Shiraishi et al. | 395/750 |
|---|---|---|---|
| 5,392,437 | 2/1995 | Matter et al. | 395/750 |
| 5,457,790 | 10/1995 | Iwamura et al. | 395/494 |
| 5,495,617 | 2/1996 | Yamada | 395/750 |
| 5,586,332 | 12/1996 | Jain et al. | 395/750 |

FOREIGN PATENT DOCUMENTS

| 0 171 088 A2 | 2/1986 | (EP) . |
|---|---|---|
| WO 93/20498 | 10/1993 | (WO) . |
| WO 95/22819 | 8/1995 | (WO) . |
| WO 96/25701 | 8/1996 | (WO) . |

OTHER PUBLICATIONS

European Search Report.

Primary Examiner—David A. Wiley
(74) Attorney, Agent, or Firm—Perman & Green, LLP (57) ABSTRACT

A data processing circuit (201) is shown having elements (315, 310) which operate in response to decoded instruction while receiving clocking signals. Instruction types are identified and clocking signals to at least one of the elements is enabled or disabled in dependence upon whether the element is required for the execution of the identified instruction type.

18 Claims, 11 Drawing Sheets

DATA PROCESSING CIRCUIT WITH GATING OF CLOCKING SIGNALS TO VARIOUS ELEMENTS OF THE CIRCUIT

BACKGROUND OF INVENTION

The present invention relates to a data processing circuit having a plurality of elements, wherein said elements operate in response to coded instructions while receiving clocking signals.

Data processing environments are known in which elements operate in response to decoded instructions while receiving clocking signals. A clocking signal is often generated by a quartz oscillator or similar and the signals are distributed throughout the circuit so as to provide a common reference for manipulations performed within the elements. The overall processing speed of a device may be increased by increasing the frequency of the clock although an upper bound will be reached beyond which satisfactory operation is not possible. Furthermore, the clocking of elements within a circuit also results in power dissipation which is an important factor when considering apparatus driven by a limited power supply, such as that provided by a battery.

A known approach towards reducing power consumption is to effectively stop the operation of the clock when processing within the circuit is not required. The chip is said to be placed in its idle mode and additional components are required in order to selectively place the circuit in one of its operational modes; that is in its active power dissipating mode or its reduced power dissipation idle mode. A problem with this approach is that the stopping of the clock results in a total shut down of the circuit therefore periods during which the clock may actually be stopped are limited and the power saving may be off-set by the additional measures that must be taken when selecting periods of shut down.

BRIEF SUMMARY OF INVENTION

According to a first aspect of the invention there is provided a data processing circuit comprising a plurality of elements, wherein said elements operate in response to decoded instructions while receiving clocking signals, comprising means for identifying instruction types; and means for enabling or disabling clocking signals to at least one of said elements in dependence upon whether said element is required for the execution of said instruction type.

According to a second aspect of the present invention, there is provided a data processing circuit comprising a plurality of elements, wherein said elements operate in response to decoded instructions while receiving clocking signals, comprising means for identifying instruction types, and means for enabling or disabling at least one of said elements in dependence upon whether said element is required for the execution of said instruction type.

In a preferred embodiment, the elements include a data processing unit and a data address generating unit and the data processing unit may include more than one multiplier and more than one arithmetic unit with co-operating multiplexed circuits.

Preferably, the means for identifying instruction types is an instruction decode unit having an instruction type decoder and the instruction type decoder may be configured to gate clock signals. Preferably, gated clock signals and input instructions are supplied to a plurality of instruction decoders. Optionally, an instruction type decoder is configured to enable or disable instruction decoders for respective instruction types, and the instruction decoders are configured to gate clock signals.

According to a third aspect of the present invention, there is provided a method of processing data, wherein a plurality of elements within a data processing circuit operate in response to decoded instructions while receiving clocking signals, comprising steps of identifying instruction type; and enabling or disabling clocking signals to at least one of said elements in dependence upon whether said element is required for the execution of said instruction type.

According to a fourth aspect of the present invention there is provided a method of processing data, wherein a plurality of elements within a data processing circuit operate in response to decoded instructions while receiving clocking signals, comprising steps of identifying instruction types, and enabling or disabling at least one of said elements in dependence upon whether said element is required for the execution of said instruction type.

DETAILED DESCRIPTION OF PREFERRED EMBODIMENTS

The invention will now be described by way of example only with reference to the previously identified drawings.

The present invention has many applications particularly in systems where power consumption is to be minimised. As an example of such an environment, the invention will be described with respect to a mobile telephone, although it should be appreciated that many other applications are also relevant.

Figure 1:
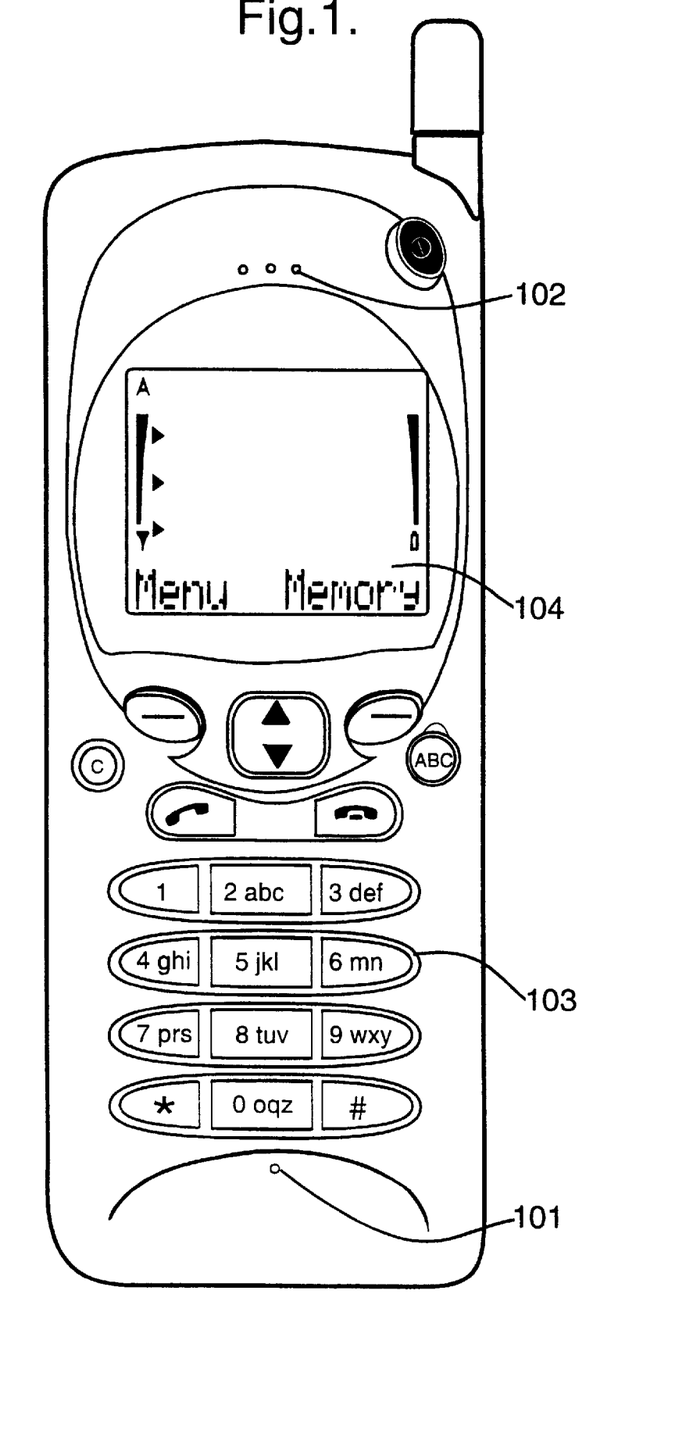
FIG. 1 shows a mobile telephone having digital signal processing circuitry.

A mobile telephone is shown in FIG. 1 configured to operate digitally in accordance with the GSM recommendations. The telephone includes a microphone 101 arranged to receive speech utterances in combination with a loudspeaker 102 arranged to supply received voice signals to an operator's ear. The telephone includes manually operable buttons 103 and a visual display 104.

Figure 2:
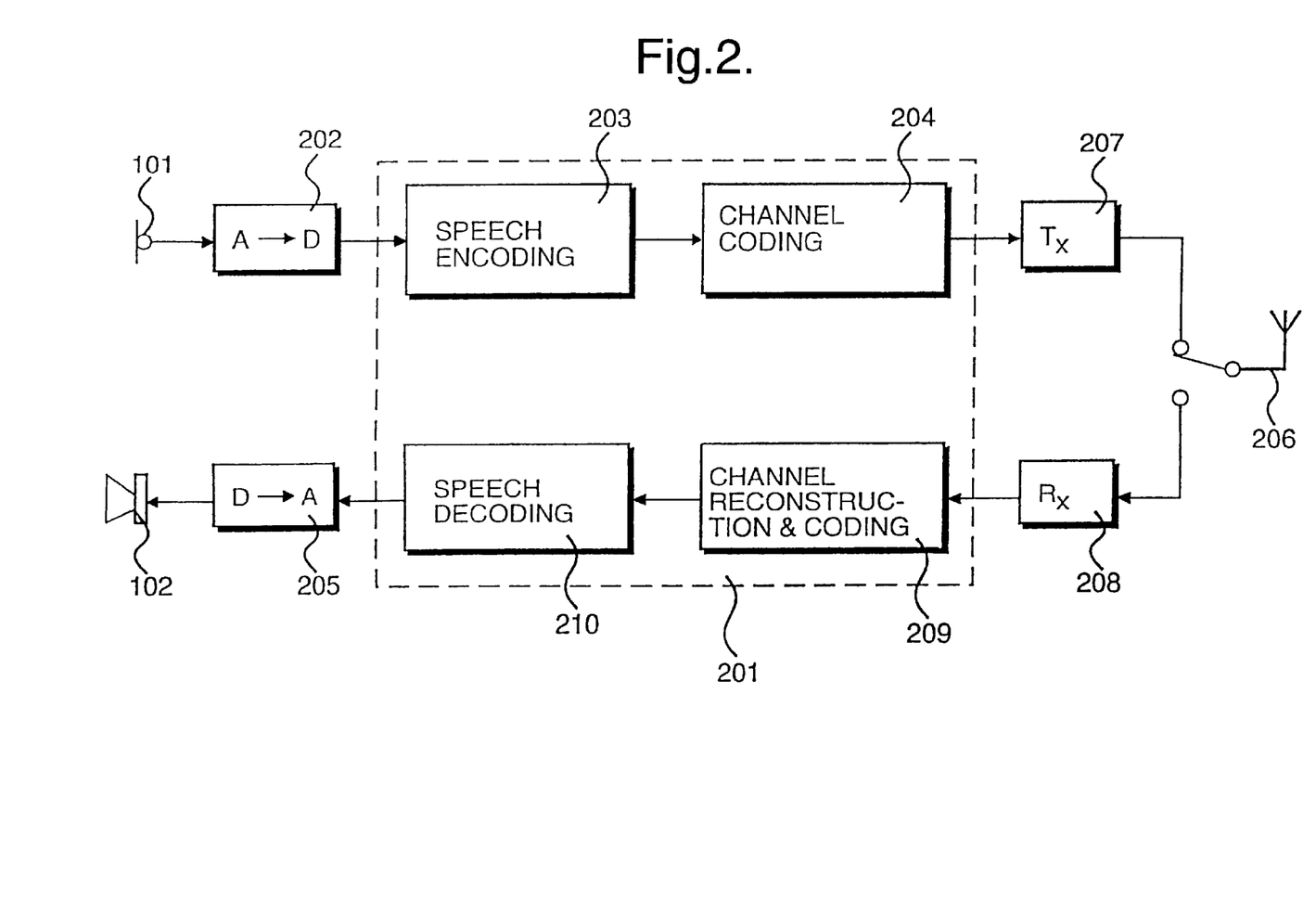
FIG. 2 shows the functionality of digital signal processing circuitry within the mobile telephone shown in FIG. 1, including a digital signal processor.

The mobile telephone shown in FIG. 1 includes a digital data processing circuit 201 as shown in FIG. 2. The processing circuit receives digital input signals from an analogue to digital converter 202 which in turn receives analogue speech signals from microphone 101. Within the data processing circuit 201, digital signals from the analogue to digital converter 202 are supplied to a speech encoding subsystem 203 which in turn supplies encoded speech to a channel coding and redundancy subsystem 204. Loudspeaker 102 receives an output from the data processing circuit 201 via a digital to analogue converter 205. Radio antenna 206 receives transmission signals from a transmitter 207 which is in turn arranged to receive outputs from the channel coding subsystem 204. The antenna 206 is also shared with a receiving circuit 208 which in turn supplies input signals to a channel reconstruction and decoding subsystem 209 within the data processing circuit 201. The output from subsystem 209 is supplied to a speech decoding subsystem 210 which in turn provides a digital speech signal to the digital to analogue converter 205.

Figure 3:
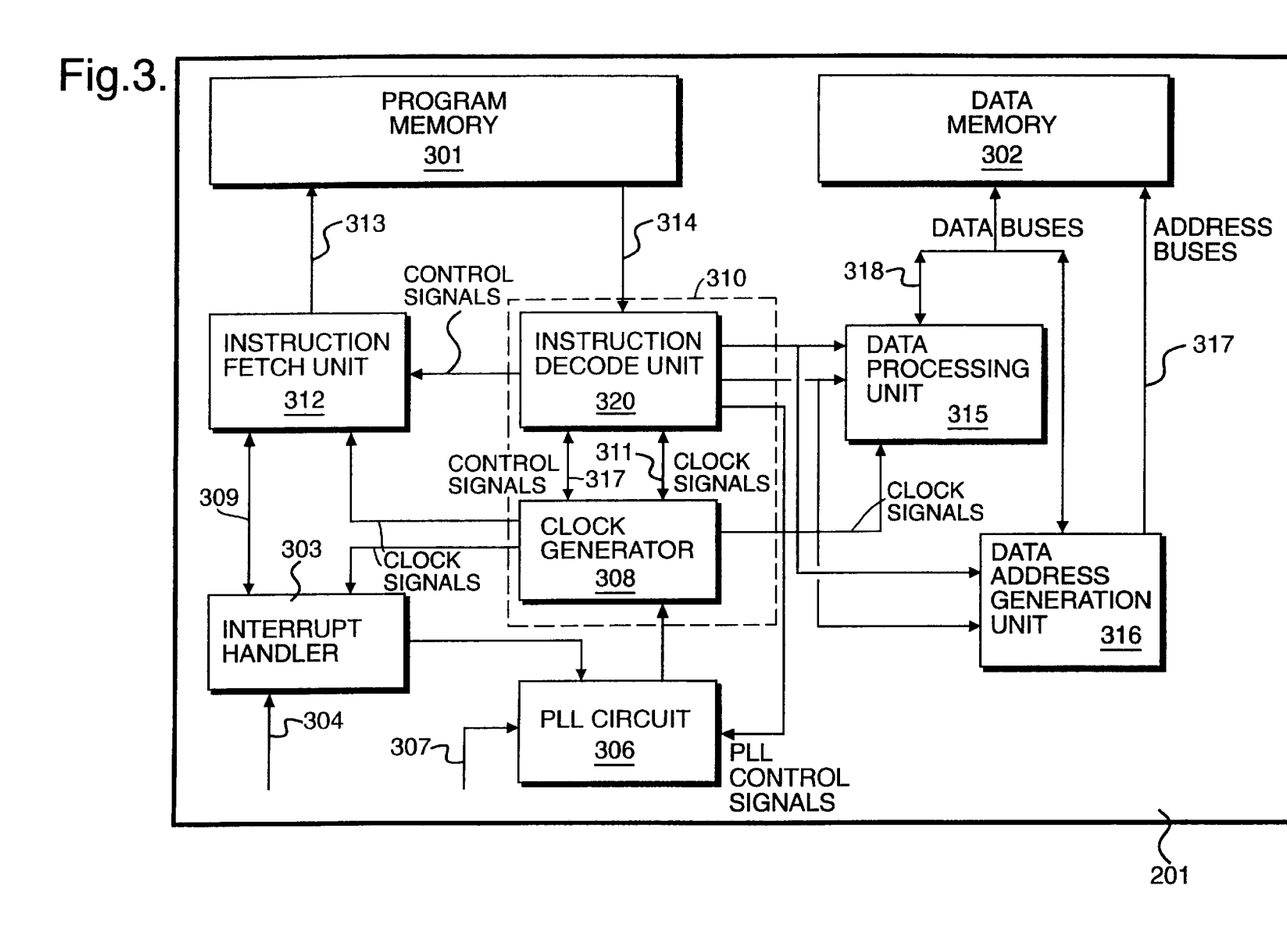
FIG. 3 details a digital signal processor of the type identified in FIG. 2, including an instruction decode unit and a data processing unit.

The data processing circuit 201 is implemented as a programmable device capable of multiplexing processes 203, 204, 209 and 210. A hardware implementation of the processing circuit 201 is shown in FIG. 3, and includes a program memory 301 and a data memory 302. Processing circuit 201 is event driven which is to say that the circuit will be placed in an idle mode when no interrupts are pending. Interrupt signals are supplied to an interrupt handler 303 by interrupt lines 304. Upon receiving an interrupt, the interrupt handler supplies an enabling signal over a line 305 to a phase locked loop circuit 306. The phase locked loop circuit receives clocking signals from a system clock over a line 307 and is arranged to supply higher frequency clock signals to a clock generator 308 over a line 309.

In conventional systems, the clock generator 308 will be arranged to supply clocking signals to virtually all of the active elements within the circuit. However, in accordance with the present invention, an instruction decode unit 320 provides clock enable signals to a clock generator 308 via a line 319. This controls the supply of the clocking signals to the active elements within the system.

The interrupt handling circuit 303 also supplies interrupt signals to an instruction fetch unit 312 over line 309 which in turn generates an address to the program memory 301 over an address bus 313. The resulting instruction read from program memory is returned to the instruction decode unit 320 over an instruction bus 314. The instruction decode unit 320 decodes the instruction read from program memory 301 and supplies appropriate control signals to a data processing unit 315 and a data address generation unit 316, as well as other units. The data address generation unit 316 addresses the data memory via an address bus 317 and the communication of data between the data memory 302 and the data processing unit 315 or the data address generating unit 316 occurs via a data bus 318.

Figure 4:
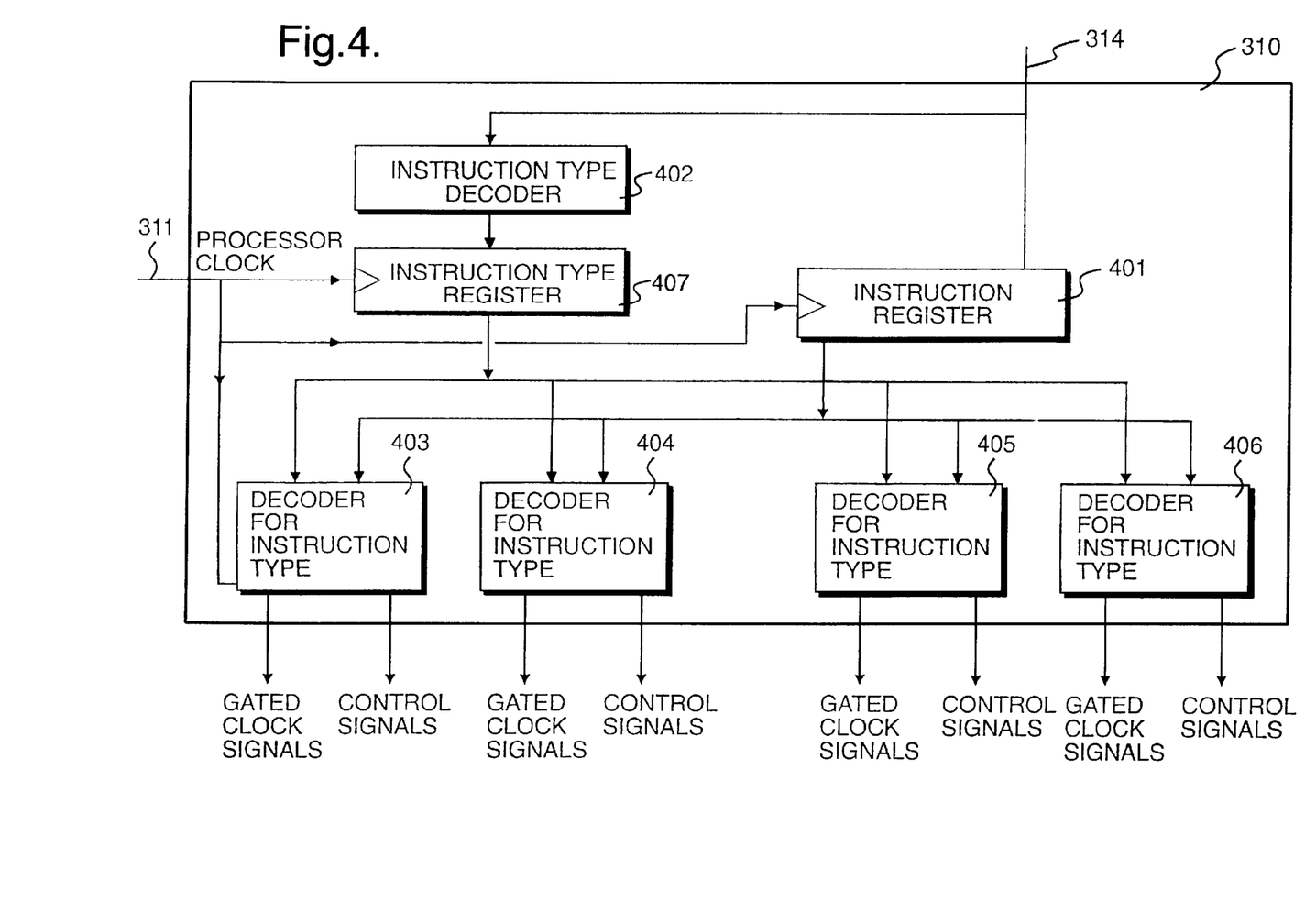
FIG. 4 details the instruction decode unit shown in FIG. 3, including an instruction type decoder.

The instruction decode and clock generator unit 310 is detailed in FIG. 4 in which instructions received from the program memory 301 via the instruction bus 314 are supplied to an instruction register 401 and an instruction type decoder 402. The instruction register 401 initiates the start of instruction decoding such that an encoded instruction will result in the appropriate control signals being supplied to the data processing unit 315, along with any other required components.

The instruction decode and clock generator unit 310 also includes a plurality of decoders for instruction type 403, 404, 405 and 406. An output from the instruction type decoder 402 is supplied to an instruction type register 407, thereby equalising the delay introduced by the instruction register 401. The instruction type register 403 also receives the clocking signal generated by clock generator 308 on line 311, which is also supplied to the instruction register 401 and to each of the decoders for instruction type 403 to 406. Similarly, the output from the instruction type register 407 and the output from the instruction register 401 are supplied to each of the decoders for instruction type 403 to 406.

The decoders for instruction type 403 to 406 are each arranged to convey clocking signals and control signals to respective parts of the data processing circuit. Thus, in addition to distributing control signals, the instruction decode and clock generator unit 310 is also responsible for distributing clocking signals. Furthermore, these clocking signals are gated such that, for a particular instruction, clock signals are only supplied to relevant parts of the circuit so that parts of the circuit that are not required to implement a particular instruction are not active and are therefore not consuming power unnecessarily.

Figure 5:
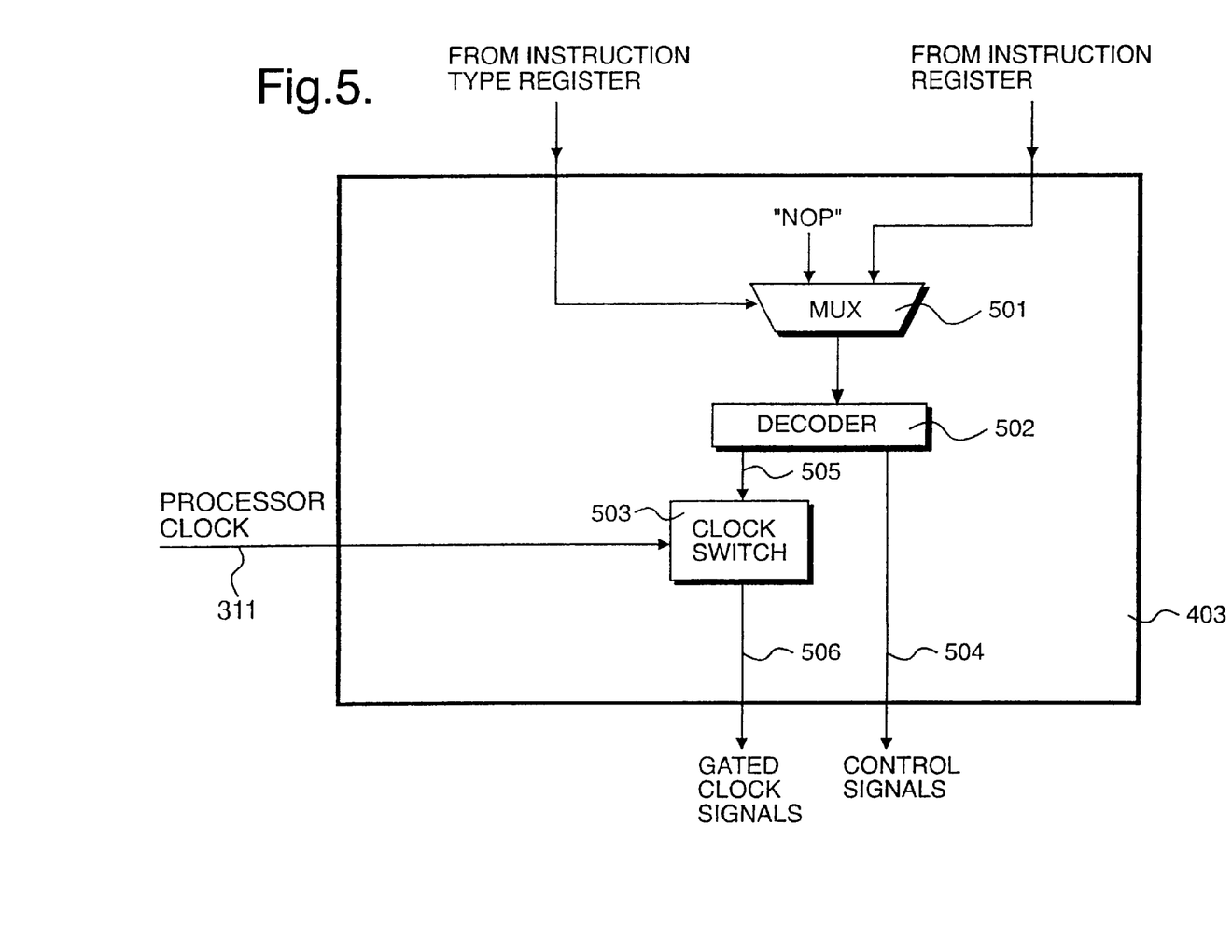
FIG. 5 details the instruction type decoder identified in FIG. 4.

Instruction type decoder 403 is detailed in FIG. 5. The decoder includes a multiplexer 501, a decoder 502 and a clock switch 503. The output from the instruction type register 407 comprises a multi-bit bus and one line from said bus is supplied to each of the decoders 403 to 406, indicating that a particular decoder is to be enabled. Thus, this enabling signal is supplied to the multiplexer 501 which, when enabled, allows data from the instruction register 401 to be conveyed to the decoder 502. Alternatively, if the multiplexer 501 does not receive an enabling signal from the instruction type register 407, a "no operation" signal is conveyed to the decoder 502, indicating that this part of the circuit is not required to perform an operation during the clock cycle under consideration.

If an instruction has been conveyed via multiplexer 501 to decoder 502, the instruction is decoded at the decoder 502 resulting in control signals being supplied over control lines 504. In addition, an enabling signal is supplied to clock switch 503 over line 505 resulting in the processor clock signal on line 311 being gated to gated clock signal lines 506. Thus, when active control signals are supplied on control signal lines 504, appropriate clock signals are distributed throughout the circuit over lines 506. However, when these elements do not require to operate in response to control signals on line 504, the clock switch is switched off, clock signals are disabled and the relevant circuit elements are left in an idle state. Thus, although the components are receiving power, they are not actually being clocked. The circuit elements are designed such that power consumption is almost zero when placed in a non-clocking state, possibly by implementation using CMOS technology.

Figure 6:
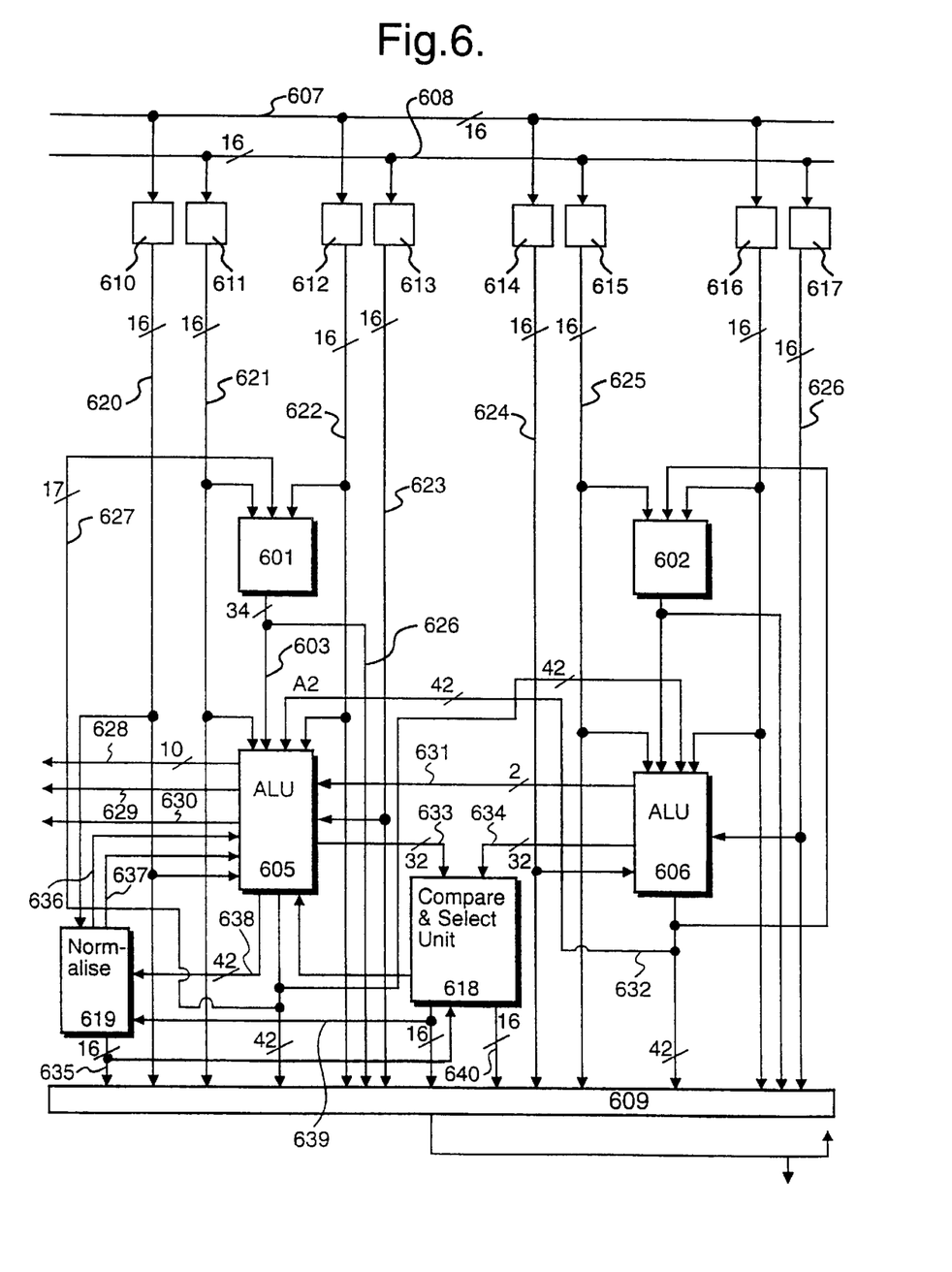
FIG. 6 details the data processing unit identified in FIG. 3, having two multipliers, two arithmetic logic units, a compare and select unit and a normalisation unit to facilitate the processing of floating point numbers.

Data processing unit 315 is detailed in FIG. 6. The data processing unit is arranged to perform multiplication operations by providing a first multiplier 601 and a second multiplier 602. Each multiplier provides a 34 bit output over respective buses 603 and 604 to respective arithmetic logic units, consisting of a first arithmetic logic unit 605, arranged to receive data from bus 603 and a second arithmetic logic unit 606 arranged to receive data from bus 604.

Data bus 407 provides for data transmission between the data processing unit 405 and the data memory 402 shown in FIG. 4. Returning to FIG. 6, this data bus is implemented as two 16 bit buses a first of which, first data bus 607, facilitates reading from the data memory 402 and writing to said data memory. A second data bus 608 is similar to data bus 607 but is only configured to read from the data memory 402.

The data processing unit includes an output multiplexer 609 configured to allow a plurality of output signals to be selectively returned to the first data bus 607 or to the data address generation unit 406.

A full clock cycle may be employed to allow the transfer of data from the data memory, given that each transfer to the data processing unit 405 is buffered by one of eight registers 610 to 617. The processing unit also includes a compare and select unit 618 and a normalising unit 619 all of the unit is clocked from a common clock source. However, in order to effectively double the speed of operation, devices to the left of the compare and select unit 618 are clocked on the rising edge of the clock source with devices to the right of the compare and select unit 618 being clocked on the falling edge of the clock source. The compare and select unit 618 is required to operate for both halves of the unit and is therefore clocked on both the rising and falling edges of the clock source. Input register 610 receives data from the first data bus 607 and, upon receiving a rising clock edge, clocks 16 bit data to the normalising unit 619 over a bus 620. Input register 611 clocks data from the second data bus 608 on a rising edge to the first multiplier 601 and to the first arithmetic logic unit 605 over bus 621. Input register 612 clocks data from the first data bus 607 on a rising edge to the first multiplier 601 over bus 622. Input register 613 clocks data from the second data bus 608 on a rising edge to the first arithmetic logic unit 605 over bus 623.

Input register 614 clocks data from the first data bus 607 on a falling edge to the second arithmetic logic unit 606 over a bus 624. Input register 615 clocks data from the second data bus 608 on a falling edge to the second multiplier 602 and to the second arithmetic logic unit 606 via bus 625. Input register 616 clocks data from the first data bus 607 on a falling edge to the second multiplier 602 and to the second arithmetic logic unit 606 over a bus 625. Input register 617 clocks data from the second data bus 608 on a falling edge to the second arithmetic logic unit 606 via bus 626.

The output from the first multiplier 601, supplied to the first arithmetic logic unit 605 over bus 603, is also supplied over a similar bus 626 to the output multiplexer 609. The output from the arithmetic logic unit 605 is returned to an input of the first multiplier 601 via a bus 627, which also supplies an output to the output multiplexer 609. Similarly, this output is also returned to an input of the second arithmetic unit, effectively as an extension of the same bus.

Ten bit bus 628 and single bit lines 629 and 630 supply data to sequencer 403 to facilitate conditional jumps. The second arithmetic logic unit 606 cannot instigate a conditional jump but overflow conditions may be identified over two control lines 631. The output from the second arithmetic logic unit 606 is returned to an input of the first arithmetic logic unit 605 via a bus 632, which also supplies said output to the output mutliplexer 609 and an input to the second multiplier 602. An output from the first arithmetic logic unit 605 is supplied to the compare and select unit 618 over a 32 bit bus 633 and a similar output is supplied to the compare and select unit 618 from the second arithmetic logic unit 606 over a 32 bit bus 634.

Normalising unit 619 produces an output exponent which is supplied, via a bus 635 to the output multiplexer 609 and to the compare and select unit 618. The normalising unit 619 generates shifting signals which are supplied to the first arithmetic logic unit 605 via shift buses 636 and 637. A 42 bit output is supplied from the first arithmetic logic unit 605 to the normalising unit 619 via a bus 638, while a bus 639 supplies an output from the compare and select unit 618 to the normalising unit 619 and to the output multiplexer 609. The data on bus 639 relates to the left side rising edge subcycle and a similar output from the compare and select unit concerning the right side falling edge subcycle is supplied to the output multiplexer 609 over a bus 640.

For the architecture shown in FIG. 6 and described in relation to a specific embodiment of the invention, arithmetic logic units 605, 606 provide respective exponent values from registers 611, 612, 615, 616 to compare and select unit 618. Optionally, an architecture may be configured such that registers 611, 612, 615, 616 provide exponent values directly to compare a select unit 618.

A compare and select unit 618 operates together with both the first arithmetic logic unit and the second arithmetic logic unit and in doing so it may compare a pair of exponent values whereafter one of said pair may be stored, dependent upon the result of the comparison. In this way, an extreme example taken from a plurality of exponent values, usually the largest exponent value is stored by the compare and select unit so as to facilitate subsequent processing and to significantly reduce the operational overhead of the arithmetic logic units. In particular, this stored value may be supplied over bus 639 to the normalising unit 619. In this way, the normalising unit may supply shifting signals to the arithmetic logic unit, in response to comparisons made by the compare and select unit, so as to normalise respective mantissa associated with exponents of floating point numbers considered by the compare and select unit.

Figure 7:
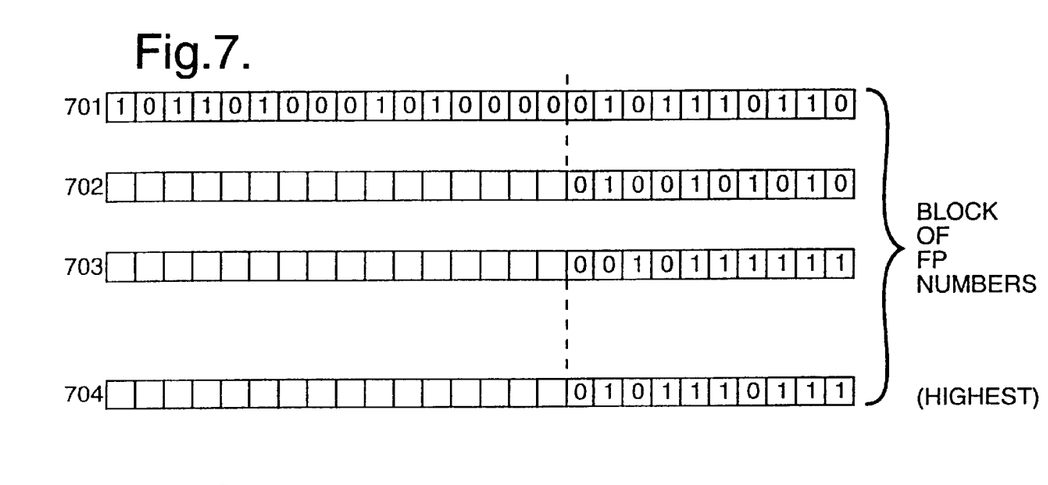
FIG. 7 shows a block of floating point numbers.

In FIG. 7 a block of floating point numbers is represented as comprising floating point number 701, floating point number 702, floating point number 703 and floating point number 704. It should be understood that a large block of floating point numbers is often encountered in data processing. Each floating point number consists of a mantissa and an exponent portion. Typically, a block of floating point numbers of this type will result from a processing algorithm which is used in one of the processors 203, 204, 210 or 209 shown in FIG. 2 operating in the mobile phone. The exponent of floating point number 701, and the exponent of floating point number 702 are similar but not the same. Furthermore the other exponents in the block of floating point numbers are likely to be similar but not identical. In order to perform efficient data processing on a block of floating point numbers, it is preferable to have matching exponents throughout the entire block of numbers.

Figure 8:
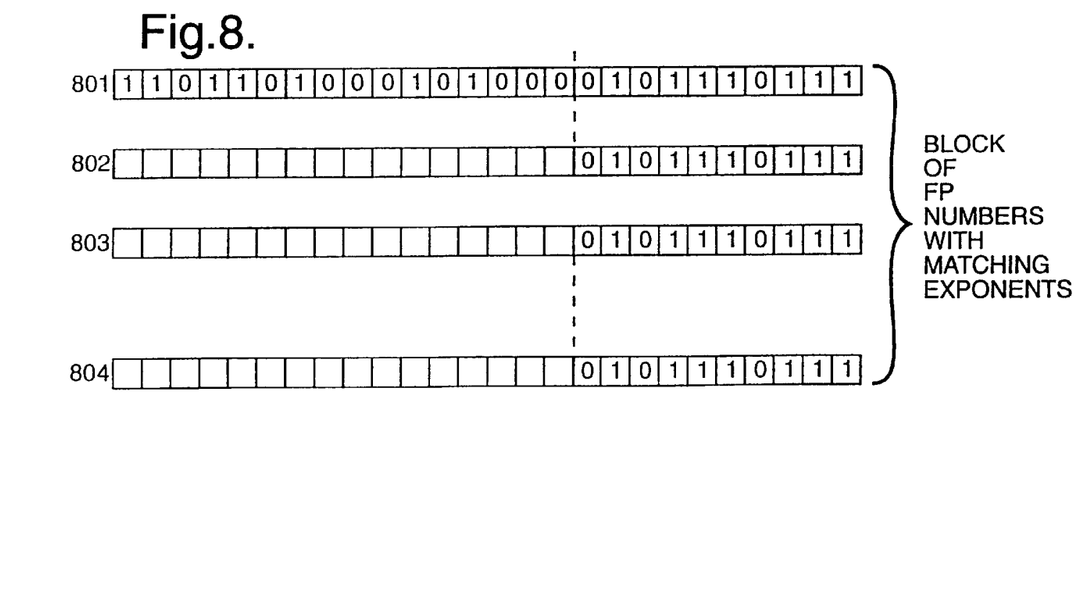
FIG. 8 shows a block of floating point numbers similar to the block shown in FIG. 7, normalised so as to have matching exponent values.

The arrangement shown in FIG. 6 facilitates efficient translation of a block of floating point numbers of the type shown in FIG. 7, into a block of floating point number of the type shown in FIG. 8, characterised by having identical exponents. There are two stages to the process of conversion from the block of floating point numbers represented in FIG. 7 to the block of floating point numbers shown in FIG. 8. The first process may be performed during generation of the floating point number block, or through a subsequent pass through the block of floating point numbers, during which exponents are compared and the greatest exponent is retained. Under program control, exponents are supplied to the compare and select unit 618, which is capable of performing comparisons between an incoming exponent and a retained high value exponent from previous comparisons. Thereby the exponents in a block of floating point numbers may be compared, and a highest exponent retained.

The second stage of the process, of converting from the block of floating point numbers shown in FIG. 7 to the block of floating point numbers shown in FIG. 8, is performed by the normalising unit 619. The highest value exponent which has been determined by the compare and select unit in the first process is retained as a number which is transferred over bus 639 to the normalising unit 619. The normalising unit receives exponents for each number in the block of floating point numbers to be converted and performs a subtraction between the highest value exponent and the exponents for each number in the block, such that the number of shifts of the mantissa that is required for each floating point number to be normalised to the highest exponent value is determined and supplied to the first arithmetic logic unit 605. The first arithmetic logic unit 605 includes a shifting circuit, which is capable of shifting the mantissa of the floating point number the desired number of binary places in a single cycle. In this way, in a two stage process, the block of floating point numbers shown in FIG. 7 is converted into the block of floating point number shown in FIG. 8, represented as floating point number 801, 802, 803 and 804. Thereby facilitating the manipulation of a block of normalised floating point numbers in the fixed point arithmetic logic unit 605.

Figure 9:
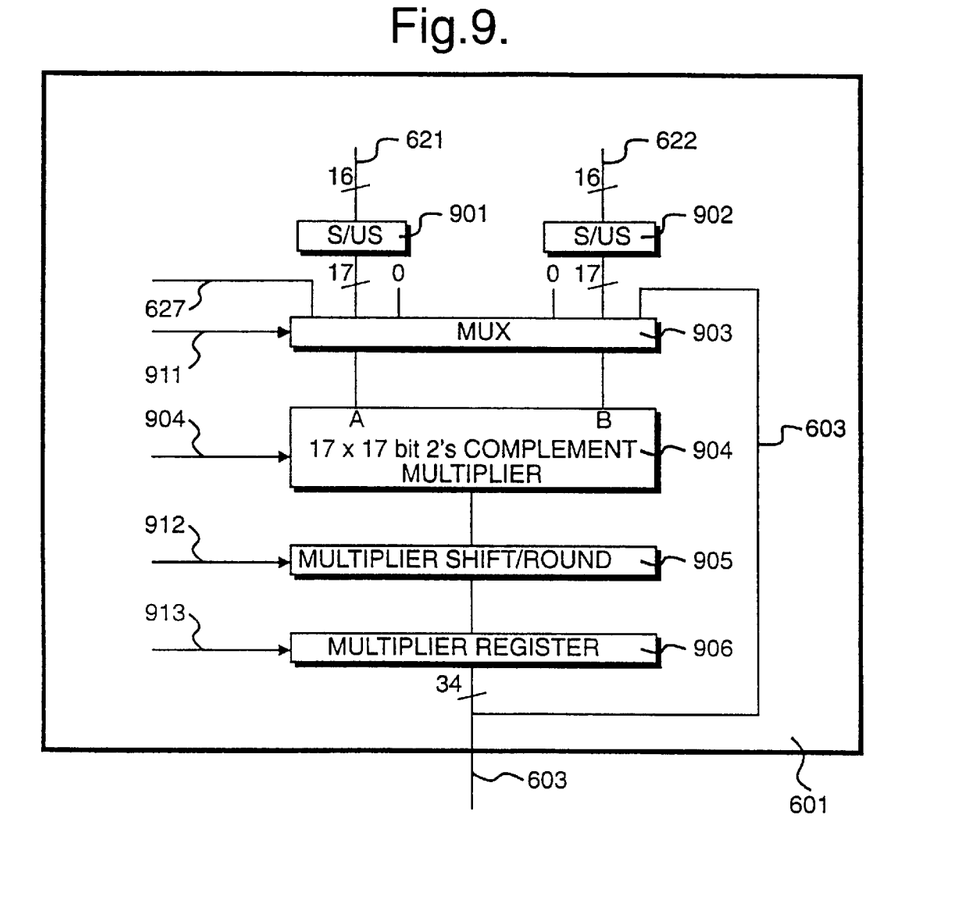
FIG. 9 details one of the multipliers shown in FIG. 6.

The multiplier 601 shown in FIG. 6 is detailed in FIG. 9. A first signed/unsigned multiplexer 901 receives control signals 911 from the sequencer 403. Data signals are received by multiplexer 901 from the data bus 621, which may then be considered as signed or unsigned under control of the sequencer 403. A similar arrangement occurs with a signed/unsigned multplexer 902 which receives signals from the data bus 622. A multiplexer 903 supplies A and B signals to a 17 bit two's compliment multipler 904. The product of this multiplication is supplied to a multiplier shift/round unit 905 which is controlled by control signals 912 from the sequencer 403. The output of the multiplier shift/round unit 905 is supplied to a multiplier register 906 which is controlled by sequencer 403 via control lines 913. The output of multiplier register 906 forms the bus 603, which may be supplied as an input to the multiplexer 903, thus facilitating feedback of multiplication products within the multiplier unit 601 itself. The multiplexer 903 may also receive predetermined fixed zero values as either or both of the multiplication operands, such that circuitry within the multiplier itself may be set to a static value, thereby reducing power consumption.

Figure 10:
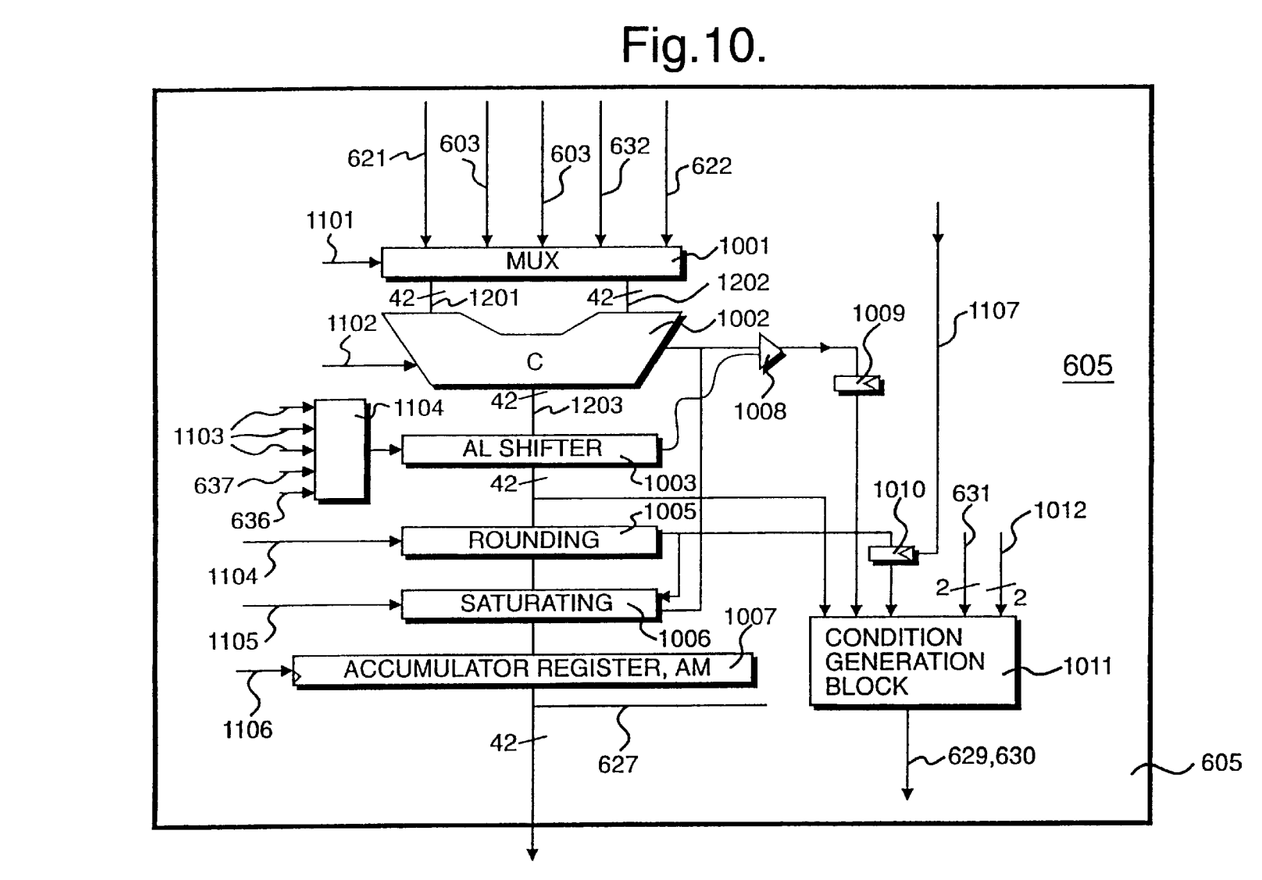
FIG. 10 details one of the arithmetic logic units shown in FIG. 6.

The first arithmetic logic unit 605 shown in FIG. 6 is detailed in FIG. 10. A multiplexer 1001 selects signals from bus 621, bus 603, bus 632, bus 622 or numeric value zero. Multiplexer 1001 is controlled by control signals supplied from the sequencer 403. An arithmetic logic circuit 1002 is controlled by control lines 1102 which are received from the sequencer 403. The arithmetic logic circuit 1002 has an numeric output 1203 which is supplied to an arithmetic logic shifter 1003. The arithmetic logic circuit 1002 further supplies condition signals to condition logic 1008, 1009, which facilitate conditional instructions, and exception condition detection.

The arithmetic logic shifter 1003 is controlled via control logic 1004, by control lines 1103, which are supplied from the sequencer 403. Control logic 1004 is also supplied by buses 636 and 637, which may be used to determine the number of binary places which the shifter should impose upon a binary number received via bus 1203. The output of the arithmetic logic shifter 1003 is supplied to a rounding unit 1005, which is controlled by a control line 1104 from sequencer 403. The rounding unit 1005 is used to convert highly precise but long binary numbers having 42 bits into shorter representations of said numbers, in order that they may be stored efficiently in memory and processed by other parts of the data processing unit which have input word lengths of less than 42 bits. The rounding unit also supplies a condition signal to condition detecting logic 1010, and a saturating circuit 1006.

The saturating circuit 1006 receives the numerical output from the rounding circuit 1005. The saturating circuit 1006 is able to perform a limiting function on numerical values which exceed a predetermined limit, again in order that large binary numbers may be reduced efficiently to a suitable word length for storage or subsequent processing. The saturation circuit 1006 is controlled by control line 1105 from sequencer 403. The saturation circuit may further be controlled by a condition signal from the arithmetic logic circuit 1002, which may indicate when a particular arithmetic logic operation has resulted in a numerical value which must be saturated.

The output of the saturating unit 1006 is supplied to an accumulator register 1007, which is clocked by a clock signal 1106. The accumulator register 1007 supplies signals to buses 627 and 628. Thereby it is possible for the accumulator register 1007 to supply a numerical value back to the multiplexer 1001, for further arithmetic logic operations.

A condition generation block 1011 receives numerical values from the arithmetic logic shifter 1003, and condition signalling from signalling logic 1008, 1009, 1010 and 1012. Signals 1012 are supplied from the compare and select unit 618. The condition generation block 1011 also receives signals from the bus 631. The condition generation unit supplies signals 629 and 630.

Figure 11:
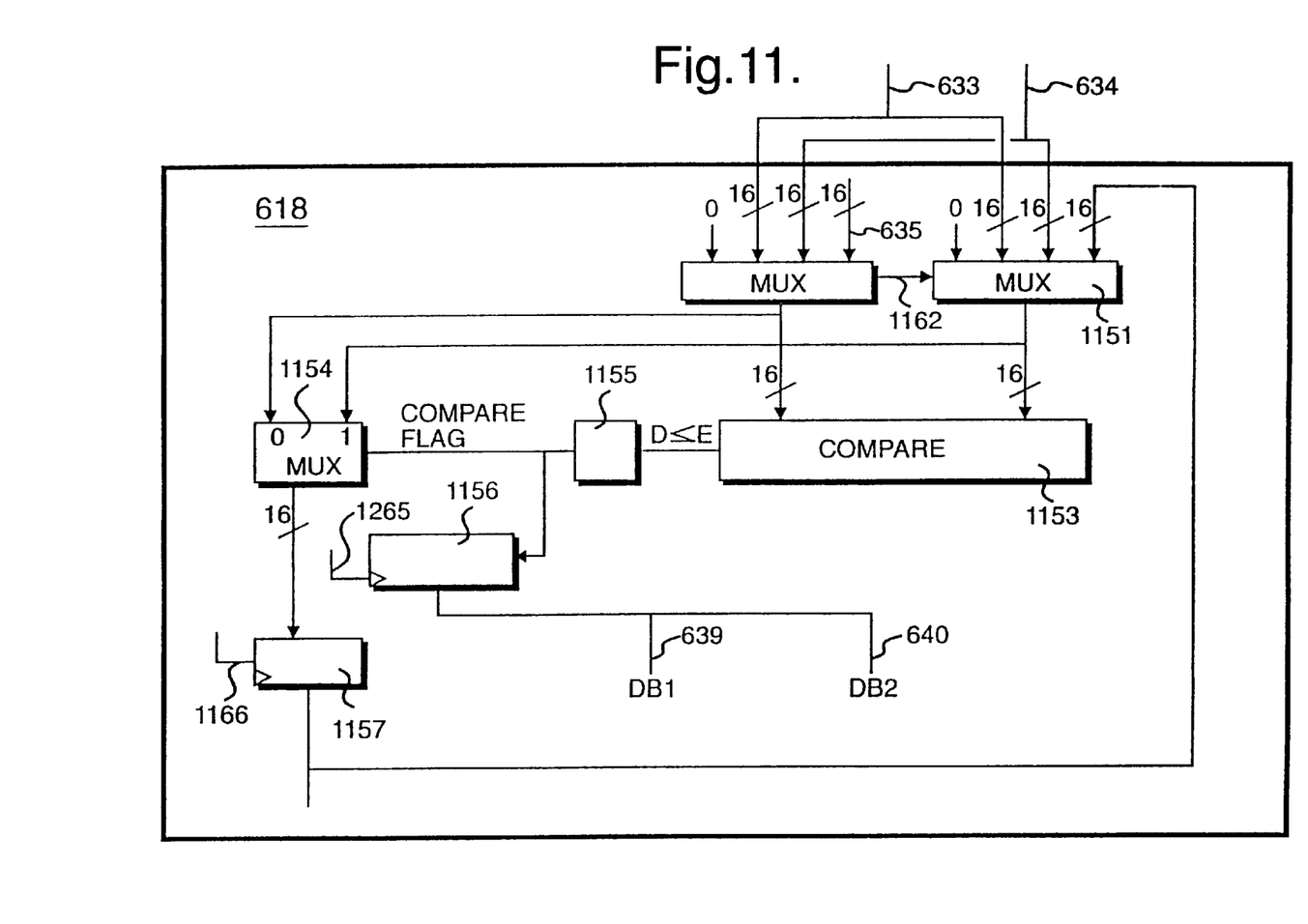
FIG. 11 details the compare and select unit shown in FIG. 6.

The compare and select unit 618 shown in FIG. 6 is detailed in FIG. 11. A low order word input multiplexer 1151 receives input values from bus 633 or bus 634. Alternatively, a zero value may be used as a numerical input to this multiplexer. A high order word input multiplexer 1152 may also receive signals from bus 633, or bus 634, or a numerical value zero. Both input word multiplexers 1151 and 1152 are controlled by control signals 1161 and 1162 which are supplied from the sequencer 403. The low order input word multiplexer 1151 may supply numerical values to a compare unit 1153 or an additional multiplexer 1154. The high order input word multiplexer 1152 supplies its numerical value to a second input of the compare unit 1153, and a second input of the additional multiplexer 1154. A compare unit 1153 generates an indication as to whether the low order word input from multiplexer 1151 is greater than or equal to the high order word input supplied from multiplexer 1152. This indication is supplied as a signal to a maximum or minimum plurality inversion circuit 1155 which generates a compare signal, which is in turn supplied to the additional multiplexer 1154 or a compare select status register 1156.

The high order input word multiplexer 1152 is further capable receiving as an alternate input the output exponent from the normalising unit 619, represented as a bus 635. The output of the additional multiplexer 1154 is supplied as an input to a compare and select register 1157, its contents typically represent the highest of a sequence of compared exponents in a block floating point exponent comparison procedure. In order to facilitate such a procedure, the output of the compare and select register 1157 must be supplied as a numerical value over an internal bus 1199 via the low order word input multiplexer 1151 to the first input of the compare unit 1153. Then, as exponents are supplied to an input of the high order word input multiplexer 1152, comparisons may be made such that the highest of a sequence of compared exponents will end up being stored in the compare and select register 1157.

The compare and select status register 1156 supplies numerical values to buses 639 and 640. This register also receives a clock signal 1165 from control circuitry. The compare and select register 1157 is clocked by a signal 1166 from control circuitry.

Figure 12:
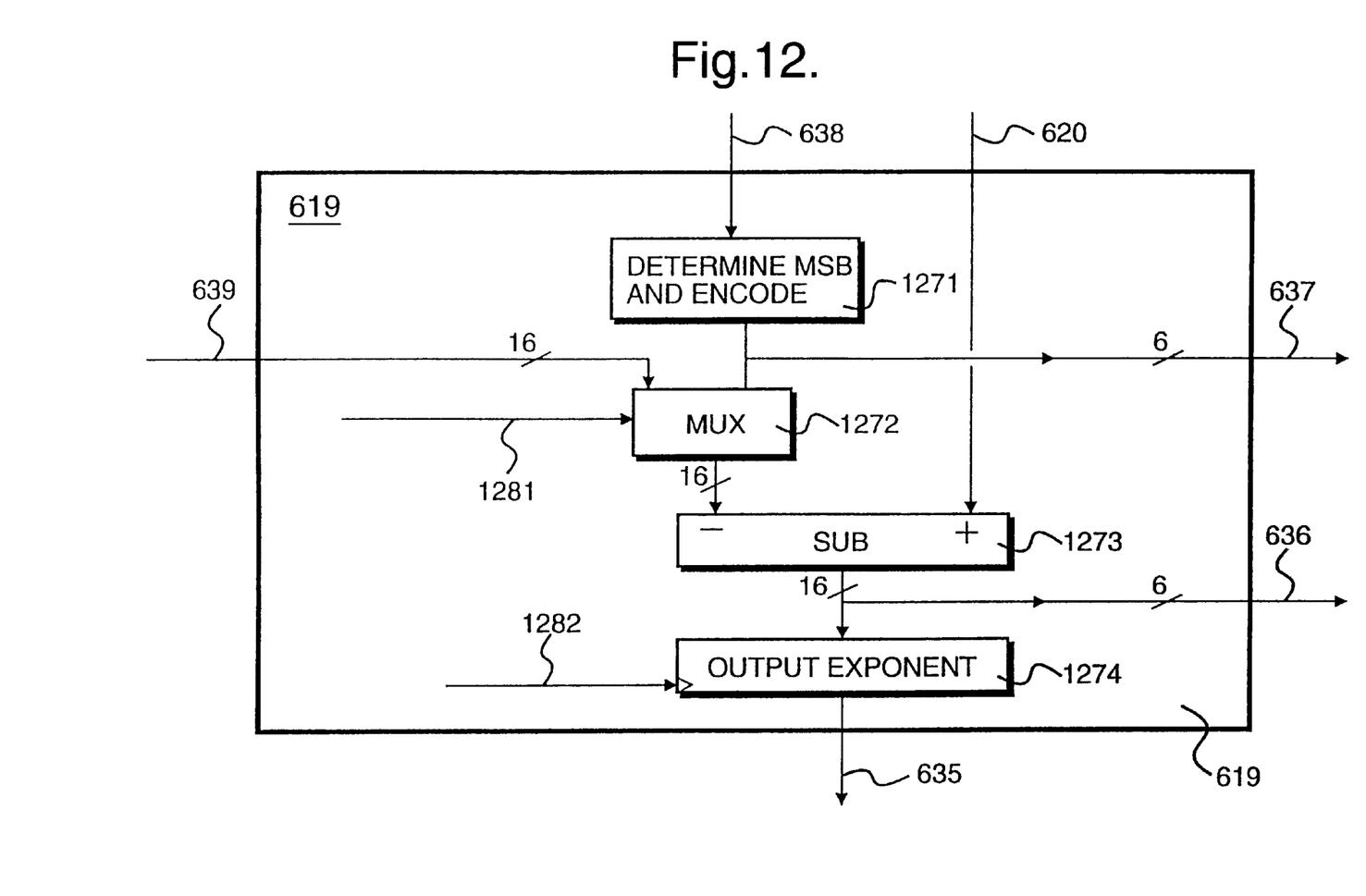
FIG. 12 details the normalising unit shown in FIG. 6.

The normalising unit 619 shown in FIG. 6 is detailed in FIG. 12. The bus 638 supplies 42 bit numerical values to a unit 1271 which determines the most significant bit of the numerical value, and encodes this as a 6 bit value supplied over bus 637. This 6 bit value 637 is further supplied to a multiplexer 1272 which may alternately receive a 16 bit numerical value from the bus 639 connected to the compare and select unit 618. The 16 bit output of the multiplexer 1272 is supplied as a subtracting input to a subtractor 1273. The multiplexer 1272 is controlled by a control signal 1281. An additional input to the subtractor 1273 is supplied from bus 620. The output of the subtractor 1273 is supplied to an output exponent register 1274, which is controlled by a clock signal 1282 supplied from control circuitry. Six bits of the output from the subtractor 1273 are supplied as bus 636. The output of the output exponent register 1274 is supplied as a 16 bit numerical value to the bus 635.

In view of the foregoing description it will be evident to a person skilled in the art that various modifications may be made within the scope of the invention.

For example, in an alternative embodiment the instruction type decoder 402 and the instruction type register 407 are removed from the instruction decode unit 310. The new instruction decode unit 310 is comprised of the instruction register 401 and an instruction decoder. As in the previous embodiment instructions received from the program memory 301 are supplied to the instruction register 401 via the instruction bus 314. The output from the instruction register 401 is supplied to the instruction decoder. The instruction decoder comprises the same components as the decoder for instruction type 403 with the exception that the multiplexer 501 is removed and the instruction from the instruction register 401 is conveyed directly into the decoder 502. The decoder decodes the instruction as described previously. Thus only those elements of the processor required for execution of the instruction receive active control signals and appropriate clock signals. Current consumption in the remaining circuit elements is almost zero, when implemented using a technology such as CMOS. This embodiment is smaller and hence cheaper than the previous embodiment but consumes more power as the whole instruction decode unit is active during an instruction decode. This embodiment is an extreme example of the trade-off between the complexity of the instruction type decoder and the level of power consumption in the instruction decode unit. A person skilled in the art can determine what level of complexity in the instruction type decoder is appropriate for a particular application. The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A data processing circuit comprising a plurality of elements, wherein said elements operate in response to decoded instructions while receiving clocking signals, comprising:
a central clock providing clock signals to respective elements of said data processor circuit;
means for identifying instruction types, wherein said means for identifying instruction types is an instruction decode unit having an instruction type decoder responsive to a signal input to said data processing circuit; and
means responsive to instructions from the instruction decoder for selectively enabling or disabling clocking signals from said central clock to at least one of respective ones of said elements in dependence upon whether a respective one of said elements is required for the execution of said instruction type.

2. A data processing circuit comprising a plurality of elements, wherein said elements operate in response to decoded instructions while receiving clocking signals, comprising:
means for identifying instruction types, wherein said means for identifying instruction types is an instruction decode unit having an instruction type decoder responsive to a signal input to said data processing circuit; and
means responsive to instructions from the instruction decoder for selectively enabling or disabling at least one of respective ones of said elements in dependence upon whether said element is required for the execution of said instruction type.

3. A data processing circuit according to claim 1, wherein said elements include a data processing unit and a data address generating unit.

4. A data processing circuit according to claim 3, wherein data processing unit includes more than one multiplier and more than one arithmetic unit with co-operating multiplexed circuits.

5. A data processing circuit according to claim 1, wherein said instruction type decoder is configured to enable gating of clock signals.

6. A data processing circuit according to claim 5, wherein gated clock signals and input instructions are supplied to a plurality of instruction decoders.

7. A data processing circuit according to claim 1, wherein said instruction type decoder is configured to enable or disable instruction decoders for respective instruction types.

8. A data processing circuit according to claim 7, wherein said instruction decoders are configured to gate clock signals.

9. A method of processing data, wherein a plurality of elements within a data processing circuit operate in response to decoded instructions while receiving clocking signals, comprising steps of:
providing a central clock outputting clock signals to respective elements of said data processor circuit;
identifying instruction types, wherein instruction types are identified by means of an instruction decode unit having an instruction type decoder and being operative in response to a signal input to said data processing circuit; and
in response to instructions from the instruction decoder, selectively enabling or disabling clocking signals from said central clock to at least one of respective ones of said elements in dependence upon whether a respective one of said elements is required for the execution of said instruction type.

10. A method of processing data, wherein a plurality of elements within a data processing circuit operate in response to decoded instructions while receiving clocking signals, comprising steps of:
identifying instruction types, wherein instruction types are identified by means of an instruction decode unit having an instruction type decoder responsive to a signal input to said data processing circuit; and in response to instructions from the instruction decoder, selectively enabling or disabling at least one of respective ones of said elements in dependence upon whether said element is required for the execution of said instruction type.

11. A method of processing data according to claim 9, wherein the enabling or disabling of clocking signals is effected with respect to clocking signals supplied to a data processing unit and to a data address generating unit.

12. A method of processing data according to claim 10, wherein the enabling or disabling of at least one of said elements is effected with respect to control signals supplied to a data processing unit and to a data address generating unit.

13. A method according to claim 11, wherein said data processing unit is configured to perform multiplication functions and arithmetic functions, implemented by more than one multiplier and more than one arithmetic unit with co-operating multiplexed circuits.

14. A method according to claim 10, wherein clock signals are gated by means of said instruction type decoder.

15. A method according to claim 14, wherein gated clock signals and input instructions are supplied to a plurality of instruction decoders.

16. A method according to claim 10, wherein said instruction type decoder is configured to enable or disable instruction decoders for respective instruction types.

17. A data processing circuit comprising a plurality of elements, wherein said elements operate in response to decoded instructions while receiving clocking signals from a common source, comprising:

a central clock providing clock signals to respective elements of said data processor circuit;

means associated with each of said elements for identifying instruction types by decoding an instruction transmitted to a respective one of said elements, said identifying means comprising an instruction type decoder responsive to a signal input to said data processing circuit; and means in respective ones of said elements and activated by respective ones of said identifying means for enabling or disabling clocking signals from said central clock applied to respective ones of said elements, said instructions conforming to a requirement of each of a respective one of said elements for the execution of said instruction type.

18. A method of processing data, wherein a plurality of elements within a data processing circuit operate in response to decoded instructions while receiving clocking signals from a common source, comprising steps of:

providing a central clock outputting clock signals to respective elements of said data processor circuit;

identifying instruction types by means of an instruction decode unit having an instruction type decoder and being operative in response to a signal input to said data processing circuit, said identifying step being accomplished in each of said elements; and in response to instructions from the instruction decoder, selectively enabling or disabling clocking signals from said central clock to at least one of respective ones of said elements in dependence upon whether a respective one of said elements is required for the execution of said instruction type, said enabling step being accomplished in each of respective ones of said elements in response to respective ones of said instructions received at respective ones of said elements.

* * * * *